(12) United States Patent
Araki et al.

(10) Patent No.: US 8,244,441 B2
(45) Date of Patent: Aug. 14, 2012

(54) AUTOMATIC TRANSMISSION CONTROL DEVICE, TRANSMISSION DEVICE, AND POWER OUTPUT DEVICE

(75) Inventors: Shoichiro Araki, Anjo (JP); Takafumi Hayashi, Anjo (JP)

(73) Assignee: Aisin Aw Co., Ltd., Tokyo (JP)

( * ) Notice: Subject to any disclaimer, the term of this patent is extended or adjusted under 35 U.S.C. 154(b) by 0 days.

(21) Appl. No.: 12/963,070

(22) Filed: Dec. 8, 2010

(65) Prior Publication Data

US 2011/0190991 A1 Aug. 4, 2011

(30) Foreign Application Priority Data

Jan. 29, 2010 (JP) ................................. 2010-018462

(51) Int. Cl.
*G06F 7/00* (2006.01)
(52) U.S. Cl. .......................................... 701/58; 477/107
(58) Field of Classification Search .................... 701/62; 74/335; 477/107
See application file for complete search history.

(56) References Cited

U.S. PATENT DOCUMENTS

| | | | | |
|---|---|---|---|---|
| 5,046,383 | A * | 9/1991 | Butts et al. ..................... | 477/120 |
| 5,079,970 | A * | 1/1992 | Butts et al. ..................... | 477/102 |
| 7,635,316 | B2 * | 12/2009 | Nakajima et al. ............. | 477/107 |

FOREIGN PATENT DOCUMENTS

| | | |
|---|---|---|
| JP | 8-291860 A | 11/1996 |
| JP | 2004-314842 A | 11/2004 |
| JP | 2004-352244 A | 12/2004 |
| JP | 2007-263135 A | 10/2007 |
| JP | 2008-064156 A | 3/2008 |

OTHER PUBLICATIONS

International Search Report for corresponding International Patent Application No. PCT/JP2010/072523 mailed Feb. 22, 2011.

* cited by examiner

*Primary Examiner* — Behrang Badii
*Assistant Examiner* — Shardul Patel
(74) *Attorney, Agent, or Firm* — Sughrue Mion, PLLC

(57) ABSTRACT

An automatic transmission control device for improving shift feel includes a pressure regulating device that regulates a friction engagement element, and transmits power to an output shaft, which is input to an input shaft through a change of a shift speed by controlling the pressure regulating device to switch an engagement state. When changing shift speed while applying torque to the input shaft, the transmission changes the shift speed via (1) a torque phase where torque is changed according to shift speed after shifting, and (2) an inertia phase where an input shaft rotation speed is changed according to the shift speed after shifting. During a shift speed change, the regulating device executes the torque phase by engaging the engagement element at a predetermined pressure with slip and standby, and executes the inertia phase by reducing an amount according to the shift speed so a shifting condition falls within a predetermined range regardless of changed shift speed, and reduces input shaft torque by a set amount, while standing by at the predetermined engagement pressure.

7 Claims, 7 Drawing Sheets

FIG.2

|  |  | C-1 | C-2 | C-3 | B-1 | B-2 | F-1 | GEAR RATIO | STEP RATIO |
|---|---|---|---|---|---|---|---|---|---|
|  | P |  |  |  |  |  |  | — |  |
|  | REV |  |  | ○ |  | ○ |  | 3.394 |  |
|  | N |  |  |  |  |  |  | — |  |
| D | 1st | ○ |  |  |  | ● | ○ | 4.148 | 1.75 |
|  | 2nd | ○ |  |  | ○ |  |  | 2.370 | 1.52 |
|  | 3rd | ○ |  | ○ |  |  |  | 1.556 | 1.35 |
|  | 4th | ○ | ○ |  |  |  |  | 1.155 | 1.34 |
|  | 5th |  | ○ | ○ |  |  |  | 0.859 | 1.25 |
|  | 6th |  | ○ |  | ○ |  |  | 0.686 |  |

○ : ENGAGED;  ● : ENGAGED WHEN ENGINE BRAKE IS IN OPERATION

AUTOMATIC TRANSMISSION CONTROL DEVICE, TRANSMISSION DEVICE, AND POWER OUTPUT DEVICE

INCORPORATION BY REFERENCE

The disclosure of Japanese Patent Application No. 2010-018462 filed on Jan. 29, 2010 including the specification, drawings and abstract is incorporated herein by reference in its entirety.

BACKGROUND OF THE INVENTION

The present invention relates to an automatic transmission control device for controlling an automatic transmission that includes a pressure regulating device that regulates an engagement pressure of at least one friction engagement element, and is capable of transmitting power to an output shaft, which is input from a power source to an input shaft through a change of a shift speed by controlling the pressure regulating device to switch an engagement state of the friction engagement element, wherein when the shift speed is changed while torque is applied to the input shaft, the automatic transmission changes the shift speed through two phases that respectively are a torque phase in which transmission of the torque is changed to be made in accordance with a shift speed after shifting, and an inertia phase in which a rotation speed of the input shaft is changed to a rotation speed corresponding to the shift speed after shifting. The present invention also relates to a transmission device and a power output device.

DESCRIPTION OF THE RELATED ART

Conventionally, as this type of transmission device, a transmission device has been proposed in which, when shifting of an automatic transmission is requested, hydraulic pressure applied to a clutch (friction element) to be engaged is regulated to generate a change (inertia phase) in a rotation speed of an input shaft, thereby changing a shift speed (for example, refer to Japanese Patent Application Publication No. JP-A-2007-263135).

SUMMARY OF THE INVENTION

However, in the transmission device described above, normally, a step ratio differs among different pairs of shift speeds (the step ratio between shift speeds toward the deceleration side becomes increasingly larger). Thus, depending on the shift speed to be changed, time required for shifting and the change in the rotation speed of the input shaft significantly vary, and significantly influence the shift feel.

It is a main object of the automatic transmission control device, the transmission device, and the power output device of the present invention to improve the shift feel regardless of the shift speed to be changed.

The automatic transmission control device, the transmission device, and the power output device of the present invention employ the following means in order to achieve the above main object.

An automatic transmission control device according to a first aspect of the present invention is an automatic transmission control device for controlling an automatic transmission that includes a pressure regulating device that regulates an engagement pressure of at least one friction engagement element, and is capable of transmitting power, which is input from a power source to an input shaft through a change of a shift speed by controlling the pressure regulating device to switch an engagement state of the friction engagement element. When the shift speed is changed while torque is applied to the input shaft, the automatic transmission changes the shift speed through two phases that respectively are a torque phase in which transmission of the torque is changed to be made in accordance with a shift speed after shifting, and an inertia phase in which a rotation speed of the input shaft is changed to a rotation speed corresponding to the shift speed after shifting. In the automatic transmission control device, when the change of the shift speed is commanded, a command is issued to a power source side and the pressure regulating device is controlled so that the torque phase is executed by engaging the friction engagement element at a predetermined engagement pressure with slip and standing by, and the inertia phase is executed by setting a target reduction amount in accordance with the shift speed commanded to be changed so as to allow a shifting condition to fall within a predetermined range regardless of the shift speed to be changed, and reducing the torque applied to the input shaft from the power source based on the set target reduction amount, while standing by at the predetermined engagement pressure.

In the automatic transmission control device according to the first aspect of the present invention, when a change of the shift speed is commanded, and a command is issued to a power source side and the pressure regulating device is controlled so that the torque phase is executed by engaging the friction engagement element at the predetermined engagement pressure with slip and standing by, and the inertia phase is executed by, while standing by at the predetermined engagement pressure, reducing the torque applied to the input shaft from the power source based on the target reduction amount that is set in accordance with the shift speed commanded to be changed so as to allow the shifting condition to fall within the predetermined range regardless of the shift speed to be changed. This can improve the shift feel regardless of the shift speed to be changed. Moreover, this also enables a quick change of the shift speed while suppressing the shift shock caused by engagement of the friction engagement element, compared to a control device that executes the inertia phase by increasing the engagement pressure with slip of the friction engagement element.

In the automatic transmission control device according to a second aspect of the present invention as described above, the target reduction amount may be set to have a tendency in which the torque is reduced by a larger amount as a step ratio when the shift speed is changed becomes larger. With this constitution, regardless of the shift speed to be changed, a time required for shifting and a degree of change in the rotation speed of the input shaft can be substantially constant.

Further, in the automatic transmission control device according to a third aspect of the present invention, as the shifting condition, the target reduction amount may be set so that the time required for shifting falls within a predetermined time range regardless of the shift speed to be changed. In the automatic transmission control device according to this aspect of the present invention, as a fourth aspect, the target reduction amount may be set so that the time required for shifting becomes substantially constant regardless of the shift speed to be changed.

Alternatively, in the automatic transmission control device according to a fifth aspect of the present invention, as the shifting condition, the target reduction amount may be set so that a degree of change in the rotation speed of the input shaft during shifting falls within a predetermined range regardless of the shift speed to be changed. In the automatic transmission control device according to this aspect of the present invention, as a sixth aspect, the target reduction amount may be set so that the degree of change in the rotation speed of the input shaft during shifting becomes substantially constant regardless of the shift speed to be changed.

A transmission device according to a seventh aspect of the present invention includes: an automatic transmission; and the automatic transmission control device according to any one of the aspects described above.

The transmission device according to the seventh aspect of the present invention includes the automatic transmission control device according to any one of the aspects described above. Therefore, the transmission device according to the present invention can achieve the same effects as achieved by the automatic transmission control device of the present invention, such as an effect in which the shift feel can be improved regardless of the shift speed to be changed, and an effect in which the shift speed can be quickly changed while suppressing the shift shock caused by engagement of the friction engagement element compared to a constitution in which the inertia phase is executed by increasing the engagement pressure with slip of the friction engagement element.

A power output device according to an eighth aspect of the present invention includes: the transmission device according to the aspect as described above; a power source; and a power source control device that controls the power source based on a command from the transmission device.

The power output device according to the eighth aspect of the present invention includes the transmission device of the present invention according to the aspects as described above. Therefore, the power output device of the present invention can achieve the same effects as achieved by the transmission device of the present invention, such as an effect in which the shift feel can be improved regardless of the shift speed to be changed, and an effect in which the shift speed can be quickly changed while suppressing the shift shock caused by engagement of the friction engagement element compared to a constitution in which the inertia phase is executed by increasing the engagement pressure with slip of the friction engagement element.

BRIEF DESCRIPTION OF THE DRAWINGS

FIG. 2 is an explanatory diagram that shows an operation chart of an automatic transmission 20;

DETAILED DESCRIPTION OF THE EMBODIMENT

Next, an embodiment for carrying out the present invention will be described using an embodiment.

[Embodiment]

Figure 1:
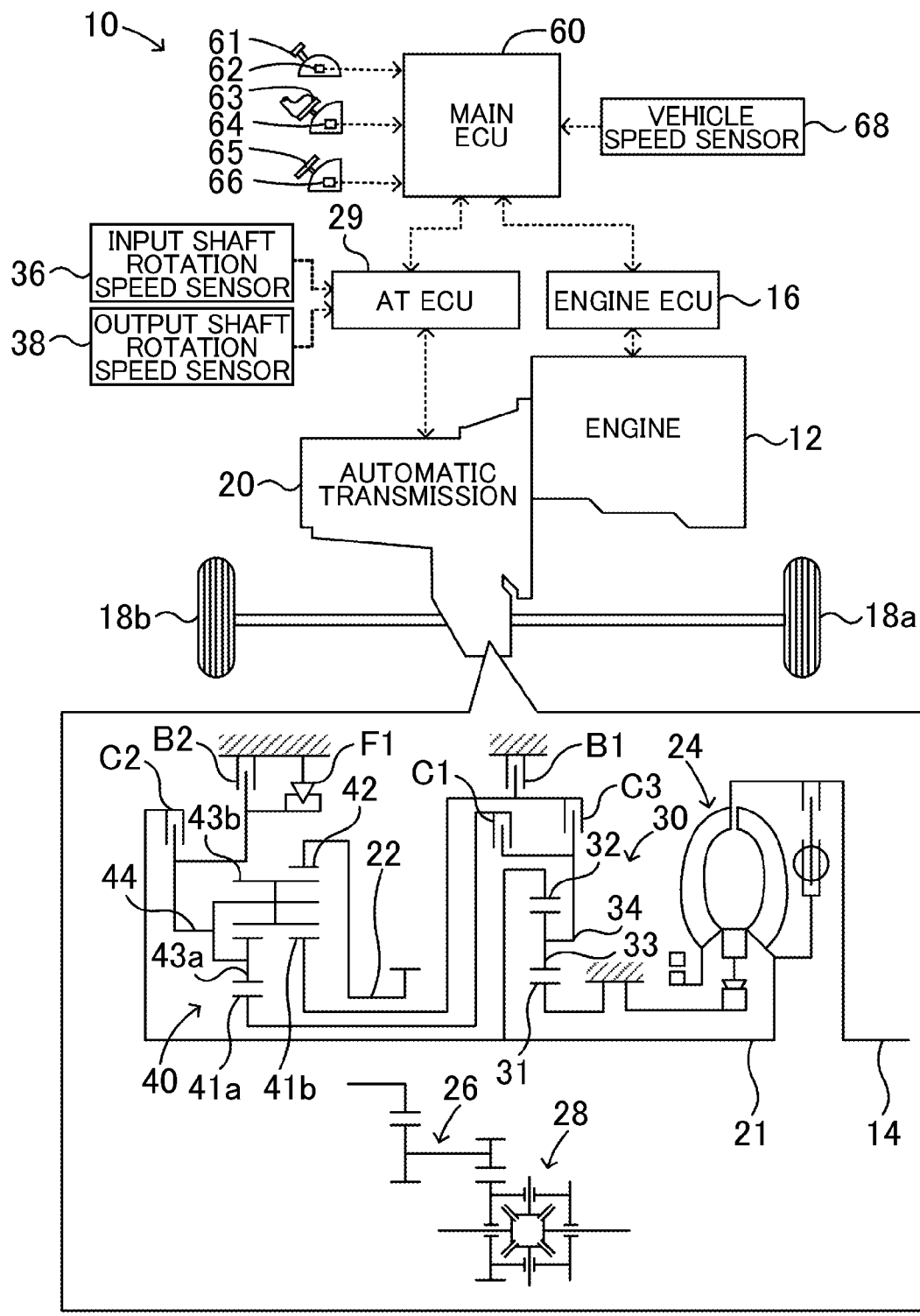
FIG. 1 is a structural diagram that shows an outline of the constitution of an automobile 10 installed with a power output device that incorporates a transmission device, and serves as an embodiment of the present invention.
Figure 3:
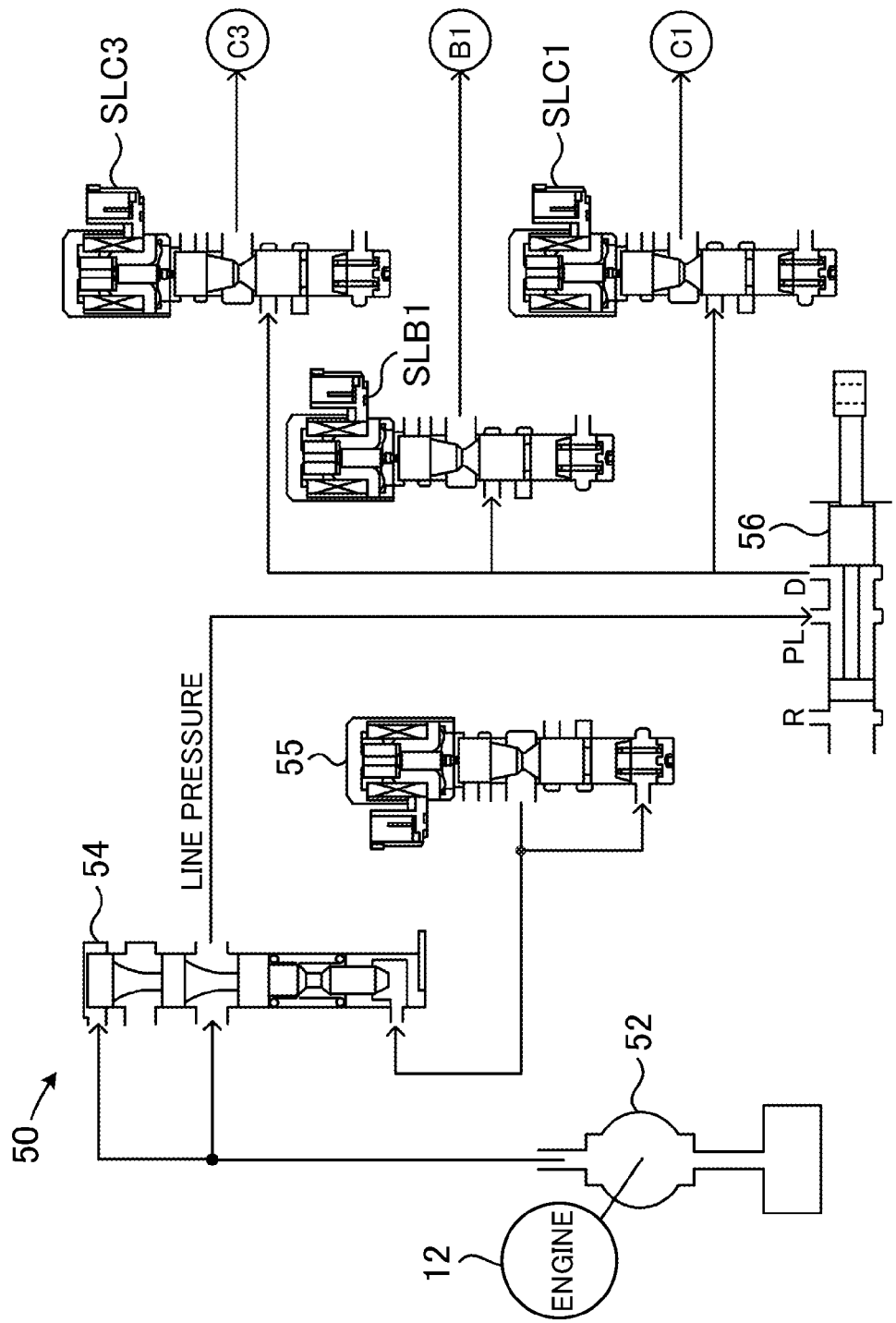
FIG. 3 is a structural diagram that shows an outline of the constitution of a hydraulic circuit 50.

FIG. 1 is a structural diagram that shows an outline of the constitution of an automobile 10 installed with a power output device that incorporates a transmission device, and serves as an embodiment of the present invention. FIG. 2 shows an operation chart of an automatic transmission 20. FIG. 3 is a structural diagram that shows an outline of the constitution of a hydraulic circuit 50 of the automatic transmission 20. As shown in FIG. 1, the automobile 10 according to the embodiment includes: an engine 12 serving as an internal combustion engine that outputs power by explosion and combustion of hydrocarbon fuel, such as gasoline or diesel oil; a torque converter 24 that is provided with a lock-up clutch and attached to a crankshaft 14 of the engine 12; an automatic transmission 20 serving as a stepped automatic transmission; and a main electronic control unit (hereinafter referred to as a "main ECU") 60 that controls the entire power output device. The automatic transmission 20 includes an input shaft 21 connected to an output side of the torque converter 24 and an output shaft 22 connected to drive wheels 18a, 18b through a gear mechanism 26 and a differential gear 28. The automatic transmission 20 changes the speed of power input to the input shaft 21 and transmits the power to the output shaft 22 at the changed speed. Note that, in the embodiment, the torque converter 24 is interposed between the engine 12 and the automatic transmission 20. However, the present invention is not limited to this, and various starting devices may be employed.

The engine 12 is operated and controlled by an engine electronic control unit (hereinafter referred to as an "engine ECU") 16. The engine ECU 16, although not shown in detail in the drawings, is constituted as a microprocessor based on a CPU. In addition to the CPU, the engine ECU 16 has a ROM that stores processing programs, a RAM that temporarily stores data, input and output ports, and a communication port. The engine ECU 16 is input through the input port with signals from various sensors required for operating and controlling the engine 12, such as a rotation speed sensor attached to the crankshaft 14. The engine ECU 16 outputs through the output port a drive signal to a throttle motor that adjusts a throttle opening, a control signal to a fuel injection valve, an ignition signal to a spark plug, and the like. The engine ECU 16 communicates with the main ECU 60. The engine ECU 16 controls the engine 12 based on a control signal from the main ECU 60, and outputs data relating to the operation status of the engine 12 to the main ECU 60 as necessary.

The automatic transmission 20 is constituted as a six-speed stepped transmission. The automatic transmission 20 includes: a single-pinion type planetary gear mechanism 30; a Ravigneaux type planetary gear mechanism 40; three clutches C1, C2, C3; two brakes B1, B2; and a one-way clutch F1. The single-pinion type planetary gear mechanism 30 includes: a sun gear 31 with external teeth; a ring gear 32 with internal teeth, which is disposed concentrically with the sun gear 31; a plurality of pinion gears 33 that mesh with the sun gear 31 and also mesh with the ring gear 32; and a carrier 34 that rotatably and revolvably holds the plurality of pinion gears 33. The sun gear 31 is fixed to a case, and the ring gear 32 is connected to the input shaft 21. The Ravigneaux type planetary gear mechanism 40 includes: two sun gears 41a, 41b with external teeth; a ring gear 42 with internal teeth; a plurality of short pinion gears 43a that mesh with the sun gear 41a; a plurality of long pinion gears 43b that mesh with the sun gear 41b and the plurality of short pinion gears 43a, and also mesh with the ring gear 42; and a carrier 44 that connects, and also rotatably and revolvably holds, the plurality of short pinion gears 43a and the plurality of long pinion gears 43b.

The sun gear 41a is connected to the carrier 34 of the single-pinion type planetary gear mechanism 30 through the clutch C1, and the sun gear 41b is connected to the carrier 34 through the clutch C3 and connected to the case through the brake B1. The ring gear 42 is connected to the output shaft 22, and the carrier 44 is connected to the input shaft 21 through the clutch C2. Further, the carrier 44 is connected to the case through the brake B2 and through the one-way clutch F1.

In the automatic transmission 20 thus constituted, it is possible to switch among first to sixth forward speeds, a reverse speed, and a neutral state by combining on and off states (where "on" corresponds to an engaged state and "off" corresponds to a disengaged state) of the clutches C1 to C3, and on and off states of the brakes B1, B2. FIG. 2 shows an operation chart of the automatic transmission 20. Note that FIG. 2 also shows respective gear ratios for the reverse speed and the first to sixth forward speeds, and step ratios obtained by dividing a low-speed side gear ratio by a high-speed side gear ratio of adjacent shift speeds among the first to sixth forward speeds. The neutral state can be established by turning off the clutches C1 to C3 and the brakes B1, B2. Further, the state of the first forward speed can be established by turning on the clutch C1 and turning off the clutches C2, C3 and the brakes B1, B2. In this state, the power input from the input shaft 21 to the ring gear 32 of the single-pinion type planetary gear mechanism 30 is transmitted to the sun gear 41a of the Ravigneaux type planetary gear mechanism 40 through the carrier 34 and the clutch C1 at a speed reduced by holding the sun gear 31 stationary and receiving a reaction force on a sun gear 31 side. The power input to the sun gear 41a is output to the output shaft 22 through the ring gear 42 at a speed reduced by holding the carrier 44 stationary using the one-way clutch F1 and receiving the reaction force on a carrier 44 side. Therefore, the power input to the input shaft 21 is output to the output shaft 22 at a speed reduced at a relatively large reduction ratio. In the first forward speed state, when an engine brake is in operation, the carrier 44 instead of the one-way clutch F1 is held stationary by turning on the brake B2. The second forward speed state can be established by turning on the clutch C1 and the brake B1, and turning off the clutches C2, C3 and the brake B2. In this state, the power input from the input shaft 21 to the ring gear 32 of the single-pinion type planetary gear mechanism 30 is transmitted to the sun gear 41a of the Ravigneaux type planetary gear mechanism 40 through the carrier 34 and the clutch C1 at a speed reduced by holding the sun gear 31 stationary and receiving the reaction force on the sun gear 31 side. The power input to the sun gear 41a is output to the output shaft 22 through the ring gear 42 at a speed reduced by holding the sun gear 41b stationary using the brake B1 and receiving the reaction force on a sun gear 41b side. Therefore, the power input to the input shaft 21 is output to the output shaft 22 at a speed reduced at a smaller reduction ratio than that of the first forward speed. The third forward speed state can be established by turning on the clutches C1, C3 and turning off the clutch C2 and the brakes B1, B2. In this state, the power input from the input shaft 21 to the ring gear 32 of the single-pinion planetary gear mechanism 30 is transmitted to the sun gear 41a of the Ravigneaux type planetary gear mechanism 40 through the carrier 34 and the clutch C1 at a speed reduced by holding the sun gear 31 stationary and receiving the reaction force on the sun gear 31 side. The Ravigneaux type planetary gear mechanism 40 rotates as a unit body by turning on the clutches C1, C3, and the power input to the sun gear 41a is output to the output shaft 22 through the ring gear 42 at a constant speed. Therefore, the power input to the input shaft 21 is output to the output shaft 22 at a speed reduced at a smaller reduction ratio than that of the second forward speed. The fourth forward speed state can be established by turning on the clutches C1, C2 and turning off the clutch C3 and the brakes B1, B2. In this state, the power input from the input shaft 21 to the ring gear 32 of the single-pinion type planetary gear mechanism 30 is transmitted to the sun gear 41a of the Ravigneaux type planetary gear mechanism 40 through the carrier 34 and the clutch C1 at a speed reduced by holding the sun gear 31 stationary and receiving the reaction force on the sun gear 31 side. Meanwhile, the power is directly transmitted from the input shaft 21 to the carrier 44 of the Ravigneaux type planetary gear mechanism 40 through the clutch C2, whereby the driving condition of the ring gear 42, that is, the output shaft 22, is determined. Therefore, the power input to the input shaft 21 is output to the output shaft 22 at a speed reduced at a smaller reduction ratio than that of the third forward speed. The fifth forward speed state can be established by turning on the clutches C2, C3 and turning off the clutch C1 and the brakes B1, B2. In this state, the power input from the input shaft 21 to the ring gear 32 of the single-pinion type planetary gear mechanism 30 is transmitted to the sun gear 41b of the Ravigneaux type planetary gear mechanism 40 through the carrier 34 and the clutch C3 at a speed reduced by holding the sun gear 31 stationary and receiving the reaction force on the sun gear 31 side. Meanwhile, the power is directly transmitted from the input shaft 21 to the carrier 44 of the Ravigneaux type planetary gear mechanism 40 through the clutch C2, whereby the driving condition of the ring gear 42, that is, the output shaft 22, is determined. Therefore, the power input to the input shaft 21 is output to the output shaft 22 at an increased speed. The sixth forward speed state can be established by turning on the clutch C2 and the brake B1 and turning off the clutches C1, C3 and the brake B2. In this state, the power input from the input shaft 21 to the carrier 44 of the Ravigneaux type planetary gear mechanism 40 through the clutch C2 is output to the output shaft 22 through the ring gear 42 at a speed increased by holding the sun gear 41b stationary using the brake B1 and receiving the reaction force on the sun gear 41b side. Therefore, the power input to the input shaft 21 is output to the output shaft 22 at a speed increased at a smaller reduction ratio than that of the fifth forward speed. The reverse speed state can be established by turning on the clutch C3 and the brake B2 and turning off the clutches C1, C2 and the brake B1. In this state, the power input from the input shaft 21 to the ring gear 32 of the single-pinion type planetary gear mechanism 30 is transmitted to the sun gear 41b of the Ravigneaux type planetary gear mechanism 40 through the carrier 34 and the clutch C3 at a speed reduced by holding the sun gear 31 stationary and receiving the reaction force on the sun gear 31 side. The power input to the sun gear 41b is output to the output shaft 22 through the ring gear 42 as a reverse rotation by holding the carrier 44 stationary using the brake B2 and receiving the reaction force on the carrier 44 side. Therefore, the power input to the input shaft 21 is output to the output shaft 22 as power in a reverse rotation at a speed reduced at a relatively small reduction ratio.

The clutches C1 to C3 and the brakes B1, B2 of the automatic transmission 20 are turned on and off by the hydraulic circuit 50 that is partially shown in FIG. 3. As shown in the drawing, the hydraulic circuit 50 is constituted of a mechanical oil pump 52, a regulator valve 54, a linear solenoid 55, a linear solenoid SLC1, a linear solenoid SLC3, a linear solenoid SLB1, and the like. The mechanical oil pump 52 pressure-feeds hydraulic oil with power from the engine 12. The regulator valve 54 regulates a pressure (line pressure PL) of the hydraulic oil pressure-fed from the mechanical oil pump 52. The linear solenoid 55 drives the regulator valve 54. The linear solenoid SLC1 is input with the line pressure PL through a manual valve 56, and regulates and outputs the line pressure PL to a clutch C1 side. The linear solenoid SLC3 similarly receives the line pressure PL through the manual valve 56, and regulates and outputs the line pressure PL to a clutch C3 side. Likewise, the linear solenoid SLB1 receives the line pressure PL through the manual valve 56, and regulates and outputs the line pressure PL to a brake B1 side. Note that, in FIG. 3, only hydraulic systems for the clutches C1, C3 and the brake B1 are illustrated. However, hydraulic systems for the clutch C2 and the brake B2 may be constituted of a similar hydraulic system.

The automatic transmission 20 (hydraulic circuit 50) is driven and controlled by an automatic transmission electronic control unit (hereinafter referred to as an "AT ECU") 29. The AT ECU 29, although not shown in detail in the drawings, is constituted as a microprocessor based on a CPU. In addition to the CPU, the AT ECU 29 has a ROM that stores processing programs, a RAM that temporarily stores data, input and output ports, and a communication port. The AT ECU 29 is input through the input port with an input shaft rotation speed Nin from a rotation speed sensor attached to the input shaft 21, an output shaft rotation speed Nout from a rotation speed sensor attached to the output shaft 22, and the like. The AT ECU 29 outputs drive signals to the linear solenoid 55, the linear solenoid SLC1, the linear solenoid SLB1, and the like through the output port. The AT ECU 29 communicates with the main ECU 60. The AT ECU 29 controls the automatic transmission 20 (hydraulic circuit 50) based on a control signal from the main ECU 60, and outputs data relating to the operation status of the automatic transmission 20 to the main ECU 60 as necessary.

The main ECU 60, although not shown in detail in the drawings, is constituted as a microprocessor based on a CPU. In addition to the CPU, the main ECU 60 has a ROM that stores processing programs, a RAM that temporarily stores data, input and output ports, and a communication port. Note that the main ECU 60 is input through the input port with a shift position SP from a shift position sensor 62 that detects an operation position of a shift lever 61, and an accelerator operation amount Acc from an accelerator pedal position sensor 64 that detects a depression amount of an accelerator pedal 63, a brake switch signal BSW from a brake switch 66 that detects depression of a brake pedal 65, a vehicle speed V from a vehicle speed sensor 68, and the like. The main ECU 60, as mentioned earlier, is also connected to the engine ECU 16 and the AT ECU 29 through communication ports, and exchanges various control signals and data with the engine ECU 16 and the AT ECU 29.

Here, the engine 12, the engine ECU 16, the automatic transmission 20, the AT ECU 29, and the main ECU 60 correspond to the power output device of the embodiment. The automatic transmission 20 and the AT ECU 29 also correspond to the transmission device.

Figure 4:
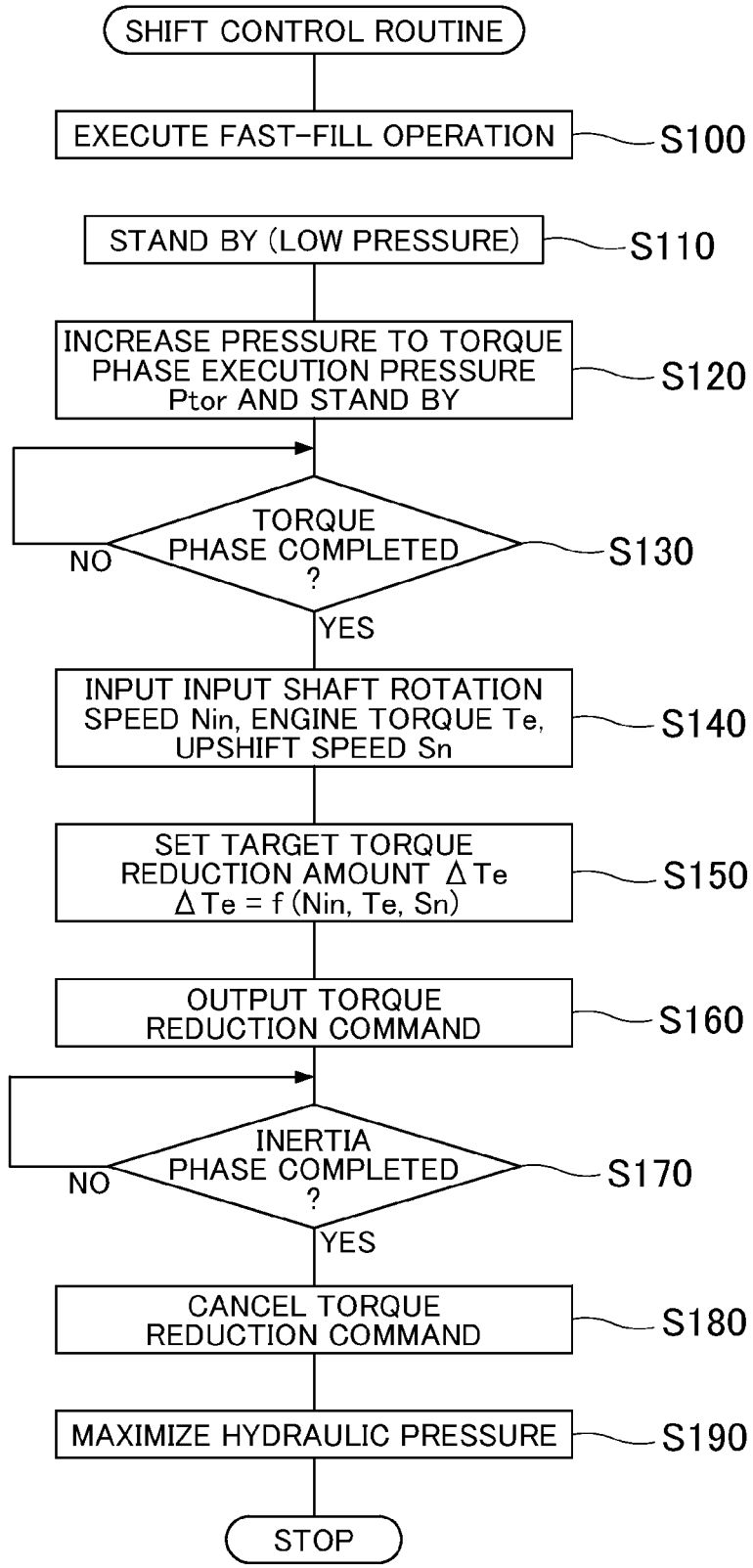
FIG. 4 is a flowchart that shows an example of a shift control routine executed by an AT ECU 29 of the embodiment.

The operation of the power output device of the embodiment thus constituted and installed in the automobile 10, and more particularly the operation when the shift speed of the automatic transmission 20 is changed, will be described next. FIG. 4 is a flowchart that shows an example of a shift control routine executed by the AT ECU 29. This routine is executed when an upshift is commanded. Note that the main ECU 60 issues the upshift command to the AT ECU 29 based on the accelerator operation amount Acc from the accelerator pedal position sensor 64 and the vehicle speed V from the vehicle speed sensor 68. The term "upshift" includes the following cases: the brake B1 is turned on by a command to upshift from the first forward speed to the second forward speed (1-2 shifting); the brake B1 is turned off and the clutch C3 is turned on by a command to upshift from the second forward speed to the third forward speed (2-3 shifting); the clutch C3 is turned off and the clutch C2 is turned on by a command to upshift from the third forward speed to the fourth forward speed (3-4 shifting); the clutch C1 is turned off and the clutch C3 is turned on by a command to upshift from the fourth forward speed to the fifth forward speed (4-5 shifting); and the clutch C3 is turned off and the brake B1 is turned on by a command to upshift from the fifth forward speed to the sixth forward speed (5-6 shifting).

When the shift control routine is executed, the CPU of the AT ECU 29 first executes a fast-fill operation such that the hydraulic oil quickly fills a clearance between a piston and a friction plate (both not shown) of the clutch (or the brake) to be turned on (S100), and executes a next operation such that the hydraulic oil pressure stands by at a low pressure (S110). When upshifting from the first forward speed to the second forward speed, the fast-fill operation is performed by driving the linear solenoid SLB1 at a relatively high duty ratio so as to supply the hydraulic oil to the brake B1 side. Note that, when the clutch or brake that has been turned on due to changing the shift speed is subsequently turned off, a draining operation is also performed to drain the hydraulic pressure applied to that particular clutch or brake.

Consequently, the AT ECU 29 applies hydraulic pressure to the clutch to be turned on based on a hydraulic pressure command to increase the pressure up to a predetermined torque phase execution pressure Ptor in a stepwise manner, and stands by (S120). The AT ECU 29 waits until the torque phase is completed (S130). Here, in the torque phase, the clutch or brake, which receives the reaction force when torque is transmitted from the input shaft 21 with the rotation speed of the input shaft 21 maintained at the rotation speed corresponding to the shift speed before shifting, is switched to the clutch or brake corresponding to the shift speed after shifting. In an inertia phase, the rotation speed of the input shaft 21 is changed to the rotation speed corresponding to the shift speed after shifting. In the embodiment, changing of the shift speed of the automatic transmission 20 is achieved through the two phases, the torque phase and the inertia phase. The predetermined torque phase execution pressure Ptor is set to a pressure empirically obtained so as to be larger than a hydraulic pressure that is necessary and sufficient for completing the torque phase and smaller than a hydraulic pressure that is necessary and sufficient for starting the inertia phase. Further, by empirically obtaining in advance a time required from the application of the torque phase execution pressure Ptor to the clutch to be turned on until the torque phase is actually completed in substance, the completion of torque phase can be determined based on whether the time required has elapsed.

Figure 5:
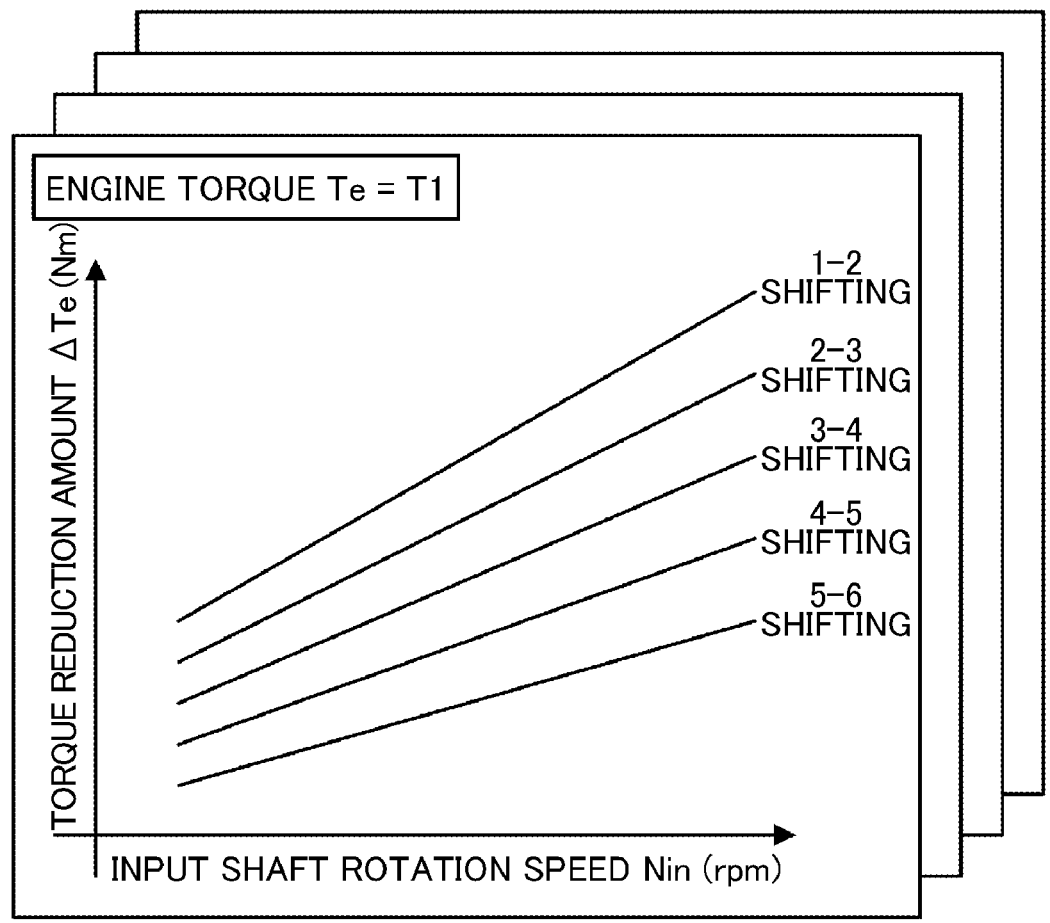
FIG. 5 is an explanatory diagram that shows an example of a torque reduction amount setting map.

When the torque phase is completed, the input shaft rotation speed Nin from the input shaft rotation speed sensor 36, an engine torque Te, and an upshift speed Sn are input to the AT ECU 29 (S140). Here, the engine torque Te detected by a torque sensor (not shown) may be input from the engine ECU 16 to the AT ECU 29 via communication, or a target torque used for controlling the engine 12 may be input from the engine ECU 16 to the AT ECU 29 via communication as the engine torque Te. Then, a target torque reduction amount ΔTe is set based on the input shaft rotation speed Nin, the engine torque Te, and the upshift speed Sn thus input, as an amount by which to reduce an output torque from the engine 12 (S150). The AT ECU 29 issues a torque reduction command using the set target torque reduction amount ΔTe so as to start the inertia phase (S160). The torque reduction command is issued and transmitted to the main ECU 60, and the main ECU 60 after receiving the torque reduction command then transmits the torque reduction command to the engine ECU 16. The engine ECU 16 after receiving the torque reduction command executes an intake air amount adjustment control, a fuel injection control, and an ignition control so as to reduce the engine torque by the target torque reduction amount ΔTe. Note that, if the determination as to whether the torque phase is completed at S130 is performed at an earlier timing that corresponds to a response time of the engine 12 to issue the torque reduction command, the torque from the engine 12 can be reduced at the timing at which the torque phase is actually completed. Here, in the embodiment, in order to obtain the target torque reduction amount ΔTe, relationships among the input shaft rotation speed Nin, the engine torque Te, the upshift speed Sn, and the target torque reduction amount ΔTe are obtained in advance, and the relationships are stored in the ROM as a target torque reduction amount setting map. When the input shaft rotation speed Nin, the engine torque Te, and the upshift speed Sn are obtained, the corresponding target torque reduction amount ΔTe is derived from the target torque reduction amount map. FIG. 5 shows an example of the torque reduction amount setting map. As shown in the map, the target torque reduction amount ΔTe is set so that the torque is reduced by a larger amount as the input shaft rotation speed Nin increases and the upshift speed Sn becomes an upshift speed toward a deceleration side. In addition, although not shown in the map, the target torque reduction amount ΔTe is set so that the torque is reduced by a larger amount as the engine torque Te at the time of shifting becomes larger. The step ratio is obtained by dividing the speed ratio between the shift speeds before upshifting by the speed ratio after upshifting, and each speed ratio is determined so that the step ratio becomes larger in the order of 1-2 shifting, 2-3 shifting, 3-4 shifting, 4-5 shifting, and 5-6 shifting (that is, the step ratio becomes larger toward the deceleration side). Therefore, if the torque reduction amount ΔTe is set the same regardless of the upshift speed Sn, as the upshift speeds Sn take on a larger step ratio, there is a tendency toward a larger time required for shifting, or a larger variation in the rotation speed (rotational acceleration) of the input shaft 21 in the inertia phase, which causes a significantly varying the shift feel. The target torque reduction amount ΔTe is set as described above in order to solve the problem of this significantly varying the shift feel. Accordingly, the setting of the target torque reduction amount ΔTe may result in a tendency in which the target torque reduction amount ΔTe becomes larger for an upshift speed Sn with a larger step ratio. In reality, the relationships among the upshift speed Sn, the engine torque Te, the input shaft rotation speed Nin, and the target torque reduction amount ΔTe are determined while considering an inertia of a rotary element relating to the upshift so that the time required for upshifting is substantially constant in any of the upshift speeds Sn. Note that the inertia phase is started by reducing the torque from the engine 12 with the hydraulic pressure of the clutch to be turned on maintained at the torque phase execution pressure Ptor. This is because it is difficult to regulate the clutch pressure (brake pressure) with a high degree of accuracy due to the mechanism of the clutch (brake), and therefore, if the inertia phase is started by increasing the hydraulic pressure applied to the clutch to be turned on, shift shock may occur due to rapid engagement. Further, if the hydraulic pressure is gradually increased in order to suppress such shift shock, the shift response may be reduced.

After the inertia phase is started, the AT ECU 29 waits until the inertia phase is completed (S170). It is possible to determine whether the inertia phase is completed by calculating the present gear ratio (reduction ratio) by dividing the input shaft rotation speed Nin from the input shaft rotation speed sensor 36 by the output shaft rotation speed Nout from the output shaft rotation speed sensor 38, and determining whether the calculated gear ratio substantially matches the gear ratio of a target gear speed. When the inertia phase is completed, the torque reduction command that has been transmitted to the engine ECU 16 through the main ECU 60 is canceled (S180), and the hydraulic pressure applied to the clutch to be turned on is maximized (S190). The present routine is then terminated.

Figure 6:
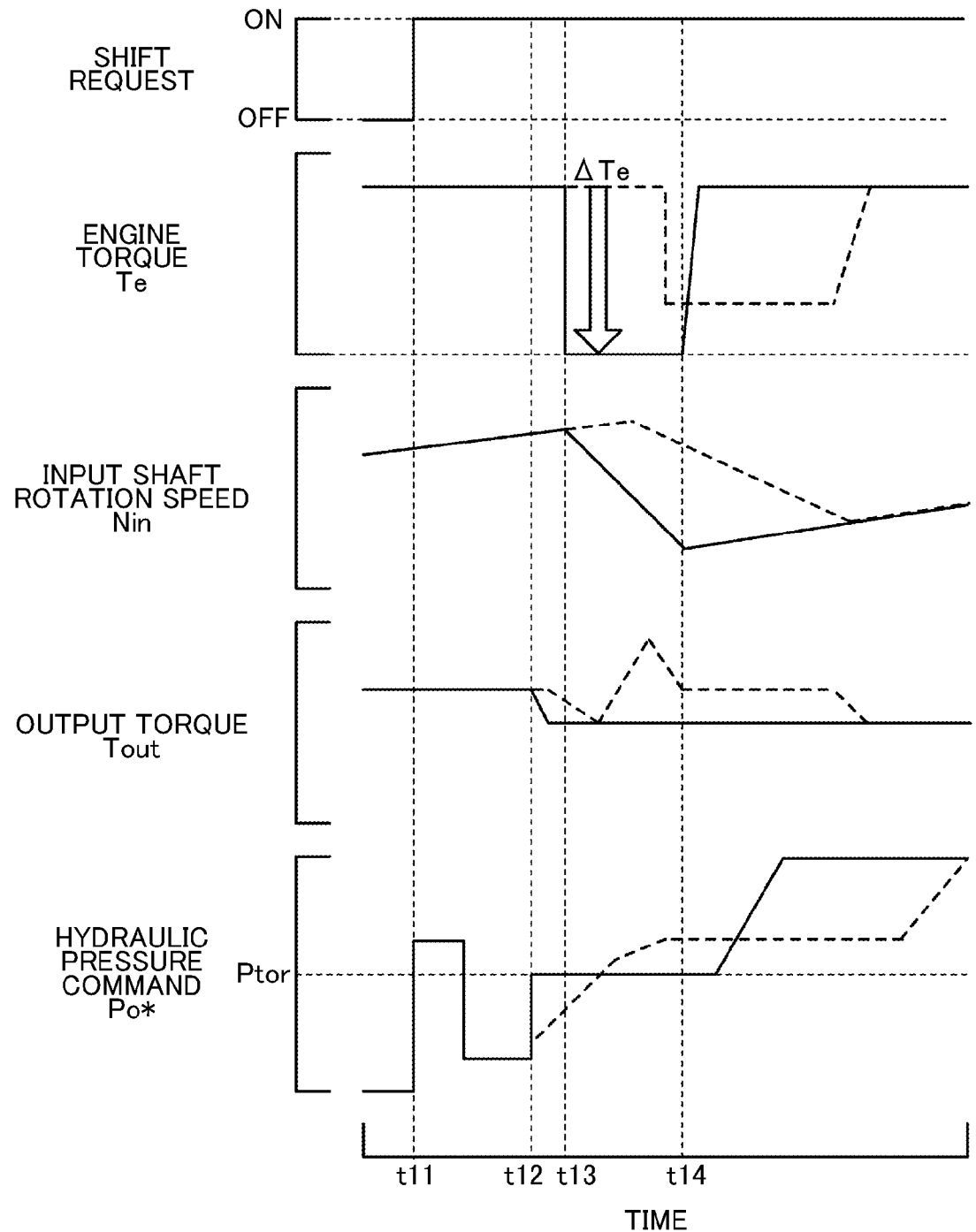
FIG. 6 is an explanatory diagram that shows changes over time of a shift request, an engine torque Te, an input shaft rotation speed Nin, an output torque Tout, and a hydraulic pressure command Po*.

FIG. 6 is an explanatory diagram that shows changes over time of a shift request, the engine torque Te, the input shaft rotation speed Nin, the output torque Tout, and a hydraulic pressure command Po*. The dotted lines in the drawing indicate changes over time of the engine torque Te, the input shaft rotation speed Nin, the output torque Tout, and the hydraulic pressure command Po* of a comparative example. In the embodiment, when an upshift request is made at a time t12, as shown in the drawing, the fast-fill operation is performed, and the torque phase is executed when the AT ECU 29 applies the torque phase execution pressure Ptor to the clutch to be turned on and stands by at the time t12. When the torque phase is completed at a time t13, the torque from the engine 12 is reduced by the target torque reduction amount ΔTe. This starts the inertia phase, and the rotation speed of the input shaft 21 (input shaft rotation speed Nin) quickly decreases toward the rotation speed after shifting. When the input shaft rotation speed Nin reaches the rotation speed after shifting and the inertia phase is completed at a time t14, the torque reduction of the engine 12 is canceled, and the hydraulic pressure applied to the clutch to be turned on is maximized. On the other hand, in the comparative example, as shown by the dotted lines, the torque phase is executed and the inertia phase is started by gradually increasing the hydraulic pressure applied to the clutch to be turned on at the time t12, and after the inertia phase is started, the torque from the engine 12 is reduced and the shift speed is changed. In this comparative example, when the shift speed is changed, the hydraulic pressure applied to the clutch to be turned on is gradually increased so as to avoid the shift shock caused by engagement of the clutch or brake. Thus, compared to the embodiment, a longer time is required to change the shift speed in the comparative example.

Figure 7:
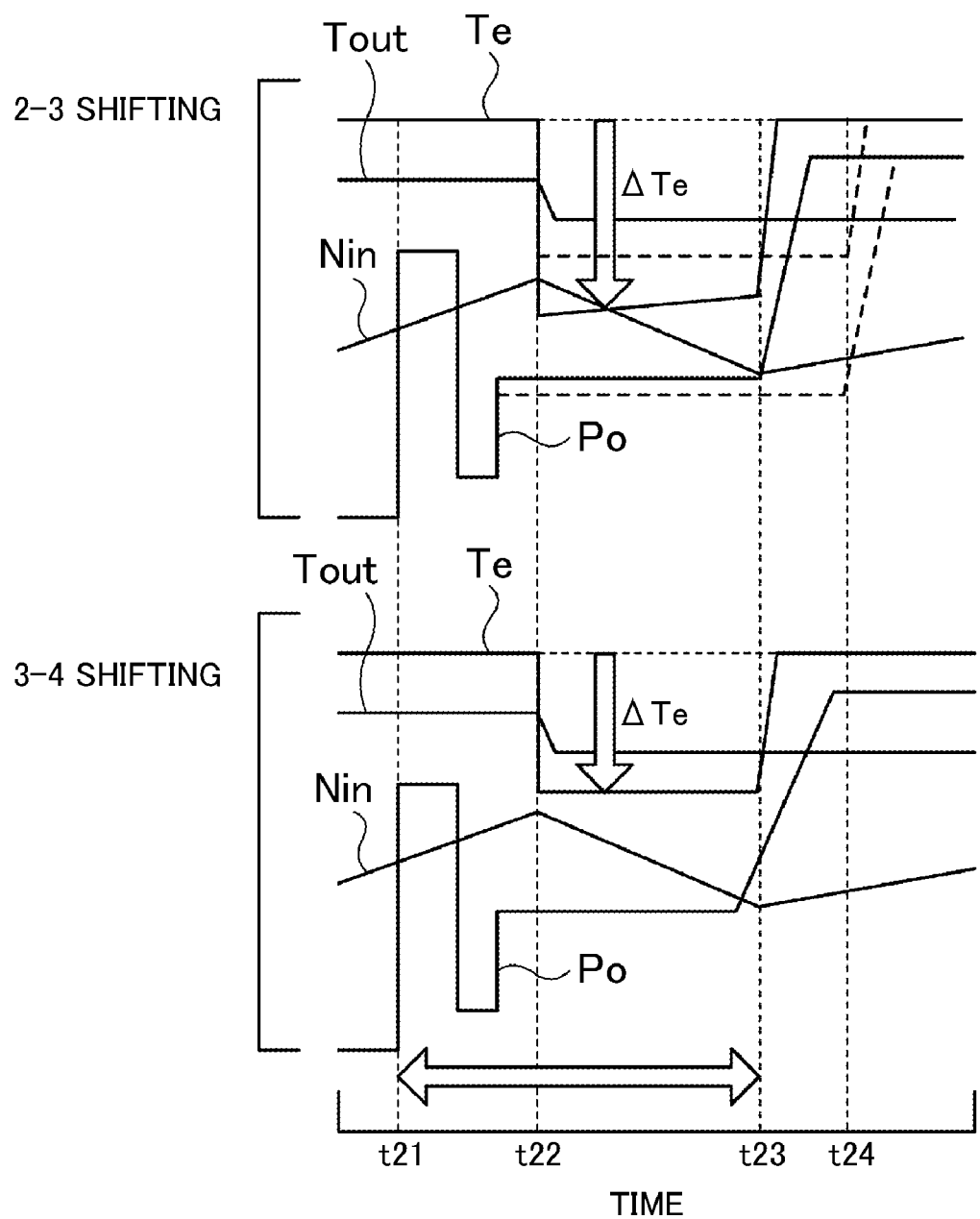
FIG. 7 is an explanatory diagram that shows shifting from a second speed to a third speed, and shifting from the third speed to a fourth speed.

FIG. 7 is an explanatory diagram that shows shifting in 2-3 shifting and shifting in 3-4 shifting. Note that the dotted lines in the drawing show shifting in the case where the torque reduction amount ΔTe of the engine 12 in 2-3 shifting and the torque reduction amount ΔTe of the engine 12 in 3-4 shifting are set to the same amount. The step ratio (the ratio obtained by dividing the gear ratio before shifting by the gear ratio after shifting) for 2-3 shifting is larger than that for 3-4 shifting. Thus, as can be seen in the drawing, the torque reduction amount ΔTe in 2-3 shifting is set larger than the torque reduction amount ΔTe in 3-4 shifting in order to match the time required for shifting in 2-3 shifting with the time required for shifting in 3-4 shifting. Note that, likewise, the torque reduction amount ΔTe in 1-2 shifting is set larger than the torque reduction amount ΔTe in 2-3 shifting, and the torque reduction amount ΔTe in 4-5 shifting is set smaller than the torque reduction amount ΔTe in 3-4 shifting. Further, the torque reduction amount ΔTe in 5-6 shifting is set smaller than the torque reduction amount ΔTe in 4-5 shifting.

According to the power output device of the embodiment as described above, when a change of shift speed is commanded while the torque from the engine 12 is applied to the input shaft 21 of the automatic transmission 20, the torque phase is executed by applying the torque phase execution pressure Ptor to the clutch to be turned on and standing by. Further, the target torque reduction amount ΔTe is set so that the engine torque is reduced by a larger amount as the upshift speed Sn becomes an upshift speed toward the deceleration side. The inertia phase is started by reducing the torque from the engine 12 by the target torque reduction amount ΔTe while standing by at the torque phase execution pressure Ptor, whereby the shift speed is changed. Thus, the shift feel can remain substantially the same regardless of the upshift speed Sn. Moreover, it is possible to quickly change the shift speed while suppressing shift shock, compared to a constitution in which the torque phase is executed and the inertia phase is started by increasing the hydraulic pressure applied to the clutch to be turned on.

In the power output device according to the embodiment, the relationship between the upshift speed Sn and the target torque reduction amount ΔTe is determined so that the time required for shifting becomes substantially constant regardless of the upshift speed Sn. However, the relationship between the upshift speed Sn and the target torque reduction amount ΔTe may be determined so that the time required for shifting falls within an allowable time range that is set for the time required for shifting. Further, the relationship between the upshift speed Sn and the target torque reduction amount ΔTe may be determined so that a change in the input shaft rotation speed Nin (rotational acceleration) during shifting becomes substantially constant regardless of the upshift speed Sn. Alternatively, the relationship between the upshift speed Sn and the target torque reduction amount ΔTe may be determined so that the change in the input shaft rotation speed Nin falls within an allowable range that is set for the change in the input shaft rotation speed Nin during shifting.

In the power output device according to the embodiment, the target torque reduction amount ΔTe is set based on the input shaft rotation speed Nin, the engine torque Te, and the upshift speed Sn. However, such setting of the target torque reduction amount ΔTe may be made without considering the input shaft rotation speed Nin, made without considering the engine torque Te, or made in consideration of other parameters.

In the power output device according to the embodiment, the target torque reduction amount ΔTe is set in consideration of the step ratio of each upshift speed Sn. However, the target torque reduction amount ΔTe may be set in consideration of the gear ratio before shifting, instead of the step ratio.

In the power output device according to the embodiment, when the torque phase is executed, the hydraulic pressure command is set so as to increase pressure up to the torque phase execution pressure Ptor in a stepwise manner and applies the hydraulic pressure to the clutch to be turned on. However, the present invention is not limited to this, and the hydraulic pressure command may be set so as to increase pressure up to the torque phase execution pressure Ptor at a gradient.

In the power output device according to the embodiment, completion of the torque phase is determined based on an elapsed time at the torque phase execution pressure Ptor. However, completion of the torque phase may be determined by determining whether vehicle acceleration is reduced based on the rotational acceleration of the input shaft 21 calculated from the input shaft rotation speed Nin from the input shaft rotation speed sensor 36 and the rotational acceleration of the output shaft 22 calculated from the output shaft rotation speed Nout from the output shaft rotation speed sensor 38, because the vehicle acceleration is reduced when the torque phase is completed. In this case, the reduction in the vehicle acceleration when the torque phase is completed becomes smaller as the gear ratio (reduction ratio) of the target gear speed is smaller. Thus, the determination described above is preferably performed only when changing to a shift speed with a relatively high gear ratio, such as the upshift from the first forward speed to the second forward speed and the upshift from the second forward speed to the third forward speed.

In the power output device according to the embodiment, the AT ECU 29 stands by with the clutch to be turned on maintained at the torque phase execution pressure Ptor from the start to the completion of the inertia phase. However, after the inertia phase is started while standing by at the torque phase execution pressure Ptor, a hydraulic pressure different from the torque phase execution pressure Ptor may be applied to the clutch to be turned on before the inertia phase is completed.

In the power output device according to the embodiment, the AT ECU 29 waits until the inertia phase is completed, and then cancels the torque reduction command transmitted to the engine ECU 16. However, the torque reduction command may be canceled before the inertia phase is completed if a recovery from the torque reduction of the engine 12 is gradually performed by gradual change processing, such as rate processing or smoothing.

The power output device according to the embodiment employs the six-speed automatic transmission 20. However, the number of shift speeds is not limited to six, and may be three to five, or at least seven.

In the embodiment, the present invention has been described in the form of a power output device. However, the present invention may take the form of an automatic transmission control device, or a transmission device.

Here, the correspondence relation will be described between main elements in the embodiment and main elements of the invention described in the Summary of the Invention. In the embodiment, the engine 12 corresponds to a "power source". The automatic transmission 20 corresponds to an "automatic transmission". The linear solenoids SLC1, SLC3, SLB1 and the like correspond to a "pressure regulating device". The AT ECU 29 that executes the shift control routine in FIG. 4 corresponds to an "automatic transmission control device". Further, the engine ECU 16 corresponds to a "power source control device". Here, the "power source" is not limited to the engine 12 serving as an internal combustion engine, and may be any type of power source as long as the device can function as the power source, such as an electric motor. The "pressure regulating device" is not limited to the linear solenoids SLC1, SLC3, SLB1 and the like that are constituted as a direct control linear solenoid that can directly control a clutch (brake) by generating an optional clutch pressure (brake pressure) from the line pressure. The "pressure regulating device" may be any device as long as the engagement pressure of the friction engagement element can be regulated, such as a device that generates the clutch pressure (brake pressure) from the line pressure by separately driving a control valve using a pilot control linear solenoid so as to control the clutch (brake). Further, the "pressure regulating device" is not limited to a device that regulates the engagement pressure of the clutch or brake using a hydraulic pressure, and may be a device that controls the engagement pressure of the clutch or brake by a fluid pressure other than a hydraulic pressure, or a device that regulates the engagement pressure of the clutch or brake by an electromagnetic force, such as an electromagnetic clutch. Note that with regard to the correspondence relation between the main elements of the embodiment and the main elements of the invention as listed in the Summary of the Invention, the embodiment is only an example for giving a specific description of an embodiment explained in the Summary of the Invention. This correspondence relation thus does not limit the elements of the invention as described in the Summary of the Invention. In other words, any interpretation of the invention described in the Summary of the Invention shall be based on the description therein; the embodiment is merely one specific example of the invention described in the Summary of the Invention.

The above embodiment was used to describe a best mode for carrying out the present invention. However, the present invention is not particularly limited to such an example, and may obviously be carried out using various embodiments without departing from the scope of the present invention.

The present invention can be used in the manufacturing industry of an automatic transmission control device.

What is claimed is:

1. An automatic transmission control device for controlling an automatic transmission that includes a pressure regulating device that regulates an engagement pressure of at least one friction engagement element, and is capable of transmitting power to an output shaft, which is input from a power source to an input shaft through a change of a shift speed by controlling the pressure regulating device to switch an engagement state of the friction engagement element, wherein when the shift speed is changed while torque is applied to the input shaft, the automatic transmission changes the shift speed through two phases that respectively are a torque phase in which a transmission of the torque is changed to be made in accordance with a shift speed after shifting, and an inertia phase in which a rotation speed of the input shaft is changed to a rotation speed corresponding to the shift speed after shifting, wherein when the change of the shift speed is commanded, a command is issued to a power source side and the pressure regulating device is controlled so that the torque phase is executed by engaging the friction engagement element at a predetermined engagement pressure with slip and standing by, and the inertia phase is executed by setting a target reduction amount in accordance with the shift speed commanded to be changed so as to allow a shifting condition to fall within a predetermined range regardless of the shift speed to be changed, and reducing the torque applied to the input shaft from the power source based on the set target reduction amount, while standing by at the predetermined engagement pressure, and wherein the target reduction amount is set to have a tendency in which the torque is reduced by a larger amount as a step ratio when the shift speed commanded to be changed becomes larger.

2. The automatic transmission control device according to claim 1, wherein as the shifting condition, the target reduction amount is set so that a time required for shifting falls within a predetermined time range regardless of the shift speed to be changed.

3. The automatic transmission control device according to claim 2, wherein the target reduction amount is set so that the time required for shifting becomes substantially constant regardless of the shift speed to be changed.

4. The automatic transmission control device according to claim 1, wherein as the shifting condition, the target reduction amount is set so that a degree of change in the rotation speed of the input shaft during shifting falls within a predetermined range regardless of the shift speed to be changed.

5. The automatic transmission control device according to claim 4, wherein the target reduction amount is set so that the degree of change in the rotation speed of the input shaft during shifting becomes substantially constant regardless of the shift speed to be changed.

6. A transmission device, comprising:
an automatic transmission; and
the automatic transmission control device according to claim 1.

7. A power output device, comprising:
the transmission device according claim 6;
a power source; and
a power source control device that controls the power source based on a command from the transmission device.

* * * * *